(12) United States Patent
Paasche et al.

(10) Patent No.: US 8,124,192 B2
(45) Date of Patent: Feb. 28, 2012

(54) LAYER APPLICATION DEVICE FOR AN ELECTROSTATIC LAYER APPLICATION OF A BUILDING MATERIAL IN POWDER FORM AND DEVICE AND METHOD FOR MANUFACTURING A THREE-DIMENSIONAL OBJECT

(75) Inventors: Norman Paasche, Mittweida (DE); Thomas Brabant, Mittweida (DE); Stefan Streit, Chemnitz (DE)

(73) Assignees: EOS GmbH Electro Optical Systems, Krailling (DE); 3D-Micromac AG, Chemnitz (DE)

( * ) Notice: Subject to any disclaimer, the term of this patent is extended or adjusted under 35 U.S.C. 154(b) by 311 days.

(21) Appl. No.: 12/215,045

(22) Filed: Jun. 24, 2008

(65) Prior Publication Data
US 2009/0017219 A1   Jan. 15, 2009

(30) Foreign Application Priority Data
Jun. 25, 2007   (DE) .......................... 10 2007 029 142

(51) Int. Cl.
*B05D 1/30* (2006.01)
*B29C 67/00* (2006.01)
(52) U.S. Cl. ......... 427/470; 264/113; 264/463; 264/510
(58) Field of Classification Search .................. 427/470; 264/113, 463, 510
See application file for complete search history.

(56) References Cited

U.S. PATENT DOCUMENTS

| | | | |
|---|---|---|---|
| 3,278,656 A * | 10/1966 | Dicks et al. .................. 264/439 |
| 3,336,903 A | 8/1967 | Point | |
| 4,863,538 A | 9/1989 | Deckard | |
| 5,053,090 A | 10/1991 | Beaman et al. | |
| 5,269,982 A * | 12/1993 | Brotz ............................ 264/438 |
| 5,908,569 A | 6/1999 | Wilkening et al. | |
| 6,066,285 A | 5/2000 | Kumar | |
| 6,136,257 A | 10/2000 | Graf et al. | |
| 6,158,346 A | 12/2000 | Zhang | |
| 6,206,672 B1 | 3/2001 | Grenda | |
| 6,251,488 B1 | 6/2001 | Miller et al. | |
| 2002/0145213 A1 | 10/2002 | Liu et al. | |
| 2003/0044524 A1 * | 3/2003 | Hoffland ....................... 427/180 |
| 2006/0150902 A1 | 7/2006 | Stelter et al. | |

FOREIGN PATENT DOCUMENTS

| | | |
|---|---|---|
| DE | 22 52 631 A1 | 5/1973 |
| DE | 43 25 573 A1 | 2/1995 |
| DE | 198 13 742 C1 | 7/1999 |

(Continued)

OTHER PUBLICATIONS

English Language Translation of WO 2006/122645 A1 on file as national phase U.S. Appl. No. 11/918,687, 2006.
English Language Translation of German Application No. DE 199 52 998 A1, 2001.
English Language Translation of German Application No. DE 10 2004 022 385 A1 on file as German Utility Model Application No. DE 20 2004 007 214 U1, 2004.

(Continued)

*Primary Examiner* — Frederick Parker
(74) *Attorney, Agent, or Firm* — George W. Neuner; Edwards Wildman Palmer LLP

(57) ABSTRACT

A device and a method for applying powder onto an application surface has a powder container (35) and a voltage source (32) for applying a voltage between the powder container and the application surface, wherein the powder container (35) at least partially consists of a conductive material and the powder container (35) has an opening (35*a*) or is completely open at its side facing the application surface when the voltage is applied.

8 Claims, 7 Drawing Sheets

FOREIGN PATENT DOCUMENTS

| | | |
|---|---|---|
| DE | 199 52 998 A1 | 5/2001 |
| DE | 10 2004 010 177 A1 | 10/2005 |
| DE | 10 2004 022 385 A1 | 11/2005 |
| EP | 0 162 645 A1 | 11/1985 |
| GB | 1 383 298 A | 2/1975 |
| GB | 2 000 990 A | 1/1979 |
| JP | 60-41571 A | 3/1985 |
| WO | WO-92/22430 | 12/1992 |
| WO | WO 2006/122645 A1 | 11/2006 |

OTHER PUBLICATIONS

English Language Translation of relevant portions German Application No. DE 10 2004 010 177 A1 (paragraph [0040-0042] and [0052]), 2005.

English Language Translation of JP 60-41571 from Japanese Online Database, 1985.

* cited by examiner

LAYER APPLICATION DEVICE FOR AN ELECTROSTATIC LAYER APPLICATION OF A BUILDING MATERIAL IN POWDER FORM AND DEVICE AND METHOD FOR MANUFACTURING A THREE-DIMENSIONAL OBJECT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

BACKGROUND OF THE INVENTION (1) Field of the Invention

The invention is related to a layer application device for an electrostatic layer application of a building material in powder form and in particular to a device and a method for a layer-wise manufacturing of a three-dimensional object, which device and method apply the layer application device.

(2) Description of Related Art

A device and a method for the manufacturing of a three-dimensional object by selective laser sintering are for example known from U.S. Pat. No. 5,908,569. A respective device is shown in FIG. 1 and will be briefly described in the following.

The laser sintering device shown in FIG. 1 has a container 1 that is open to the top, in which a support 4 for supporting the object 6 to be formed is provided. By means of a drive in the container the support 4 can be moved, up and down in a vertical direction. Above the container 1a laser 14 is arranged as irradiation device that emits a directed light beam 15. Via a deflection device 16 this light beam 15 is deflected towards the object 6 to be manufactured layer-wise.

Furthermore, an application device 12 for applying a powder material 7 that is to be solidified onto the support surface 5 or a previously solidified layer is provided. In the prior art various application devices are known, by which the powder is mechanically applied and smoothed. As an example FIG. 2 shows an application device from WO 2006/122645, which is a coating device 24 having two blades 21a and 21b, which are held together at their sides by two sidewalls in parallel to the drawing plane, which are not shown. The two blades and the two sidewalls together form a supply chamber 22 that is open to the top and to the bottom and serves for receiving the powder material for a layer. By moving the coating device 24 into the direction of the arrow B the powder 27 from the supply chamber 22 is spread across the surface 5, wherein the powder layer is smoothed down by the blades 21a and 21b.

In the laid-open German Patent Application Document DE 199 52 998 a device for a direct manufacturing of bodies is described, in which two building chambers and two powder supply chambers, respectively, lie opposite to one another similarly to quarters of a circle. The powder application in the building chambers there occurs in such a way that a cover plate of semi-circular shape, which respectively covers to adjacent chambers, is rotated. By the straight edge of the cover plate, which is formed to be a doctor, the powder is then shifted from a supply container to the adjacent building container.

In DE 10 2004 022 385 A1 the powder application is also effected by means of a rotatable doctor that is designed such that it has the shape of a ring, wherein the ring as a whole is rotated around an axis of rotation that lies outside of the ring.

Also U.S. Pat. No. 4,863,538 discloses a method and a device for manufacturing objects by means of selective sintering. In the document a pre-defined amount of the powder material is put on a support that can be lowered and is spread by means of a roller that can be moved across the support while at the same time being rotated in a direction opposite to the direction of movement across the support.

In all methods of the prior art a blade, a roller or a doctor is used for the layer application. However, the blade, the doctor or the roller in all cases applies mechanical force not only to the powder. When the powder layer has been applied onto a previously solidified layer of the part to be manufactured, then inevitably portions of the part that are already present are subjected to this force, which in general acts in a shearing way. From this a crack or a deformation may result, in particular in fragile structures or thin-wall structures. This has disadvantageous effects on the aspect ratio and the dimensional accuracy of the object to be formed.

BRIEF SUMMARY OF THE INVENTION

The object of the invention is to provide a device for a contact-free layer application, in which the above described problems no longer occur. In particular, a thereby optimized device for a layer-wise manufacturing of parts by means of sintering as well as a respective method shall be provided.

The object of the invention is achieved by a device for applying powder onto an application surface having a powder container (35) and a voltage source (32) for applying a voltage between the powder container (35) and the application surface, wherein the powder container (35) at least partially consists of a conductive material and the powder container (35) has an opening (35a) or is completely open at its side facing the application surface, when a voltage is applied.

The device of the present invention also can comprise one or more of the following features:

a) a positioning device (37) for adjusting the distance between the powder container (35) and the application surface such that for an applied voltage an electric field strength is high enough to transport the powder particles from the powder container to the application surface;

b) the adjustable field strength is higher than 1000 V/m;

c) the device is able to be used in a device for manufacturing a three-dimensional object, in which layers of a powder material are solidified at the respective positions corresponding to the cross section of the object; and d) a shaking device or vibrating device (43) that is suitable to shake the powder container during the powder application or a stirring device that is suitable to mix the contents of the powder container.

The present invention also provides a device for manufacturing a three-dimensional object by solidifying layers of a material in powder form at the positions corresponding to the respective cross section of the object having a powder application device as described herein, and a building platform (31) for supporting the object to be formed, on which building platform the powder is applied by means of the powder application device.

In other embodiments, the device for manufacturing a three-dimensional object in accord with the invention further comprises one or more of the following features:
  a) a positioning device, which positions the powder container (37) under the building platform (31) for applying the powder;
  b) a rotating device (41) to which the building platform (31) is connected via an insulator (33), wherein the rotating device (41) allows a rotation of the building platform around a horizontal axis (42) that is located above the building platform during the powder application;
  c) a solidification device (38, 39, 40);
  d) a solidification device (38, 39, 40) arranged such that the building platform has to be rotated from the position in which the powder layer application is effected to the position in which the solidification is effected by an angle of 180°;
  e) a solidification device which is a radiation source that directs electromagnetic radiation onto the powder layer;
  f) a solidification device which consists of a laser (39) and a deflection device (38) for directing the laser beam onto the powder layer;
  g) a solidification device which includes a heat radiation source for solidification by means of heat radiation;
  h) a solidification device which includes a source for emitting particle rays; and
  i) more than one powder container (35).

The object of the invention is also achieved by a method for a layer-wise manufacturing of a three-dimensional object having the steps: applying a layer of a building material in powder form onto the application surface of a building platform (31) or a previously solidified layer and selectively solidifying the applied layer at the positions corresponding to the cross-section of the object, characterized in that the powder is applied by generating an electric field between the powder container (35) and the building platform (31).

Methods for a layer-wise manufacturing of a three-dimensional object, in accord with the invention, also can comprise one or more of the following features:
  a) the powder container (35) is subjected to a vibration or a shaking process or the powder in the powder container (35) is kept in motion during the layer application by means of a stirring device;
  b) the electric field is adjusted by varying the distance between the powder container (35) and the building platform (31);
  c) the solidification is effected by the action of electromagnetic radiation on the powder;
  d) the object is generated in a recess of the application surface or in a cavity of another object;
  e) a metal powder, precious metal powder, ceramics powder, oxide powder or plastic powder is used as building material;
  f) different powders from several different powder containers (35) that differ in material and/or the medium grain size are used for the layer application; and
  g) several different powder containers (35) are used for the application of one layer.

BRIEF DESCRIPTION OF THE SEVERAL VIEWS OF THE DRAWINGS

In the following, embodiments of the invention are described based on the drawings, of which.

DETAILED DESCRIPTION OF THE INVENTION

First Embodiment

Figure 1:
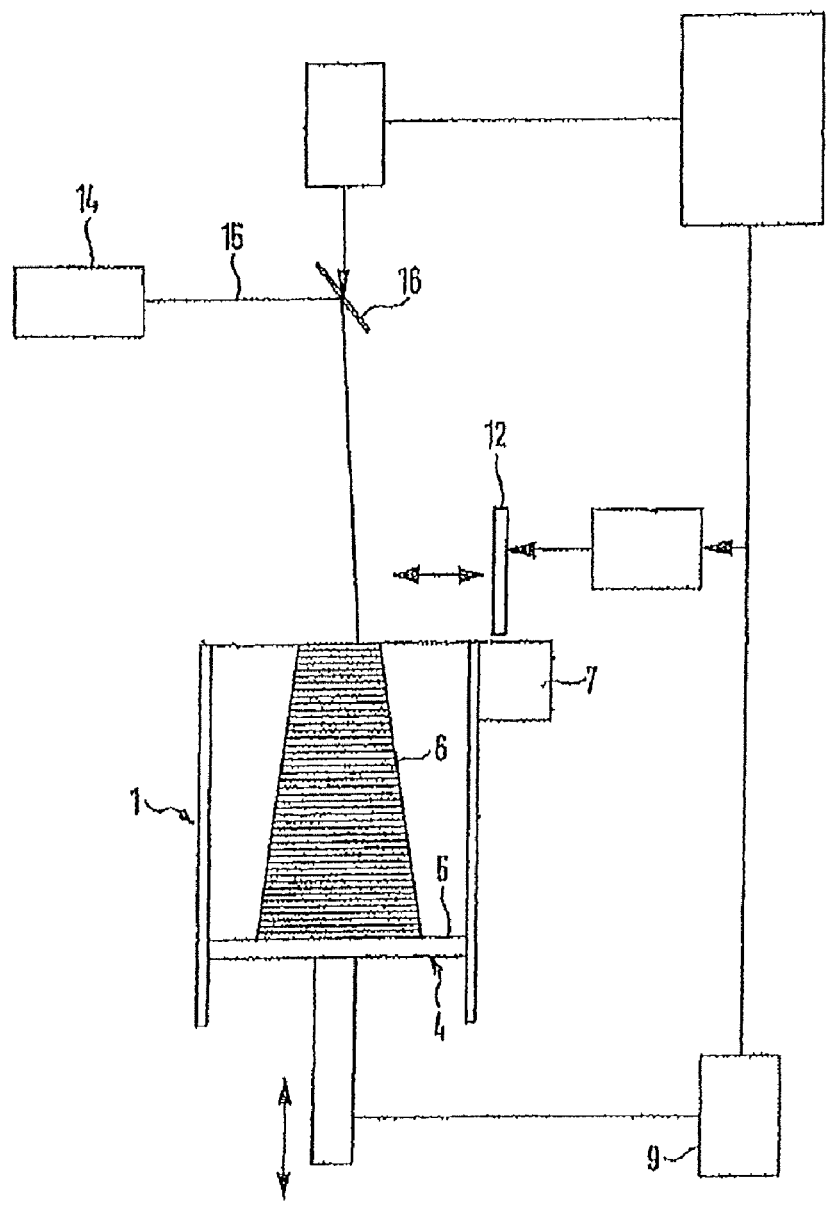
FIG. 1 shows a laser sintering device of the prior art.
Figure 2:
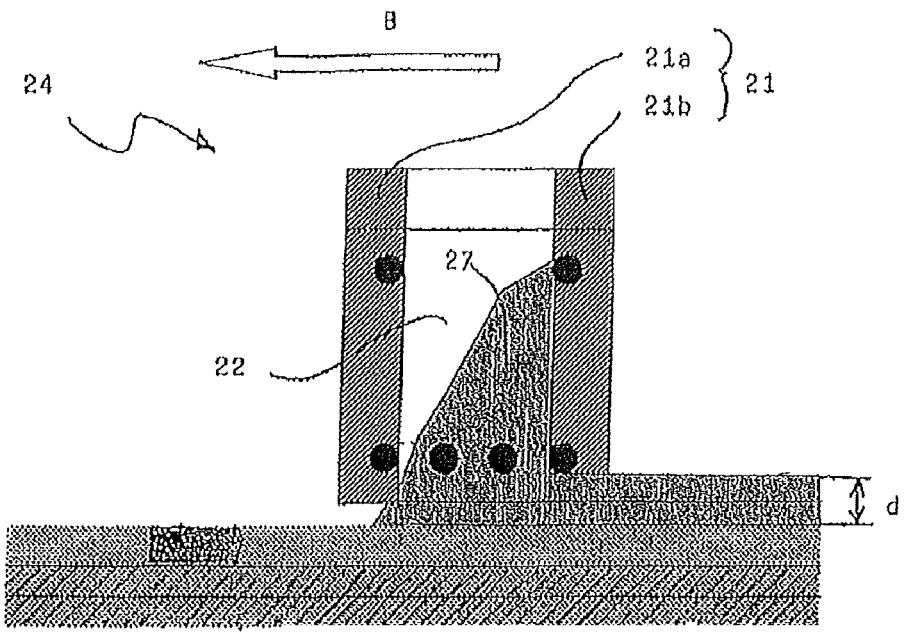
FIG. 2 shows a powder application device of the prior art.
Figure 3:
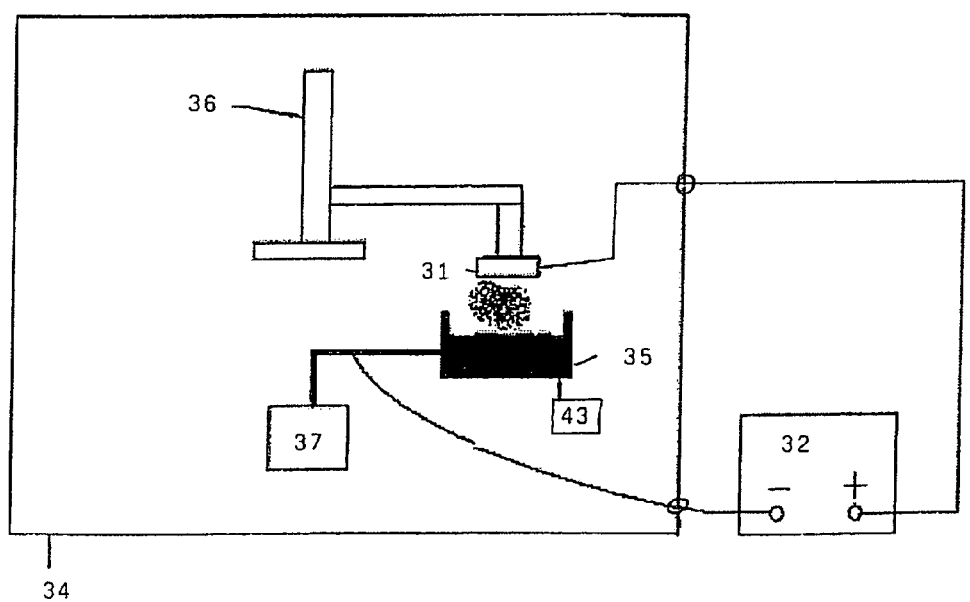
FIG. 3 shows a device according to a first embodiment of the invention during the powder application.
Figure 4:
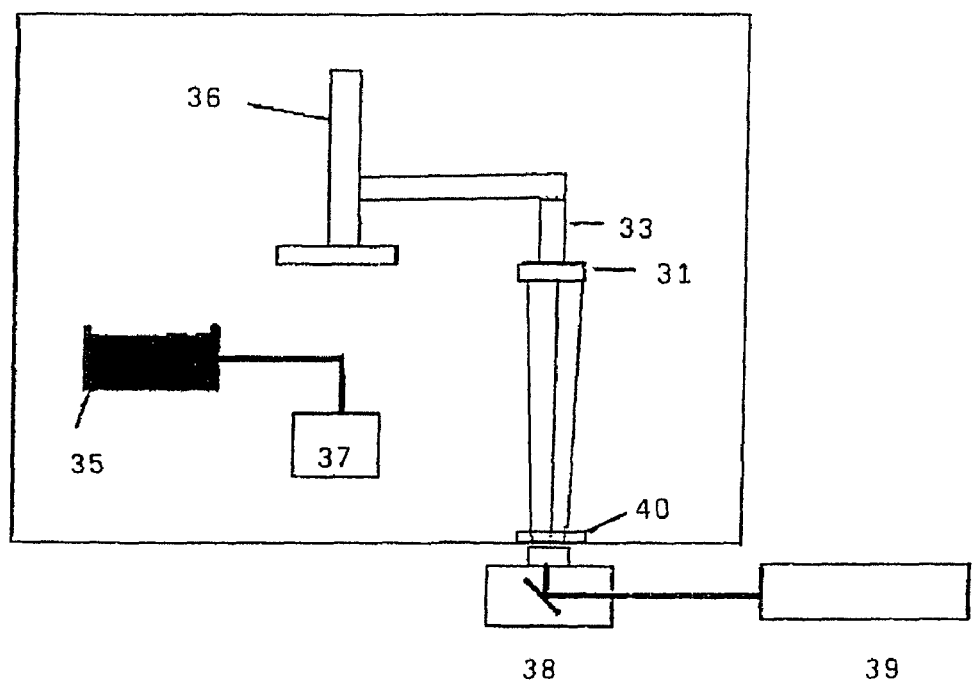
FIG. 4 shows a device according to a first embodiment of the invention during the selective layer solidification.

FIGS. 3 and 4 show a first embodiment of the invention. In FIGS. 3 and 4 a layer application device according to the invention is shown that is used in a laser sintering device. Here, FIG. 3 shows the laser sintering device during the layer application and FIG. 4 shows the same device during the layer solidification.

A building container 34, in which a three-dimensional object is manufactured layer-wise on a building platform 31 is shown in detail. The building platform 31 is mechanically connected to a lifting device 36, wherein the lifting device is able to move the building platform in a vertical direction up and down. In FIG. 3 below the building platform 31a powder container 35 with powder that shall serve as a building material for the building-up of the object, is arranged. By means of a high-voltage source 32a high-voltage is applied between the building platform 31 and the powder container 35, which high-voltage typically is in a range from 100 V to 40 kV, for example 10 kV. The building platform 31 is mechanically connected to the lifting device 36 via an insulator 33 in order to guarantee an electric decoupling.

By means of the shown set-up a powder layer can be applied onto the building platform in a contact-less way as follows:

By the application of the voltage an electric field is generated between the powder container 35 and the building platform 31 in a similar way as it is the case in a capacitor. This electric field causes a movement of the powder from the supply container 35 against the gravitational force towards the building platform 31. As a result the powder is deposited on the building platform. The necessary voltage is a result of the necessary field strength, which in turn depends on the distance of the building platform 31 from the powder container 35 and on the weight of the powder grains. When using stainless steel powder 316L having a grain size of 10 μm advantageous results were achieved with a distance of 20 mm and a voltage of 7 kV. Further materials such as a bronze-based multi-component metal powder ('Direct Metal 20', distributed by EOS GmbH Electro Optical Systems) having a grain size of 20 μm, a tungsten powder having a grain size of 6 μm and an $Al_2O_3$ ceramics powder having a grain size of 10 μm were successfully used.

The particles start to move in the electric field, because, depending on their own charge, they are attracted either to the positive electrode or the negative electrode (the building platform and the powder container, respectively). The particles in the powder reservoir are neutral in total. However, they have to be regarded as charges that are more or less insulated. Therefore, the electrodes separate particles of different charge from one another by attracting particles having an opposite charge and repelling those having the same charge.

The particles adhere to the building platform by hooking into the surface, by cohesion, by van der Waals forces and by the electrostatic attraction as long as the charge has not yet been compensated. The fact that neighbouring separate powder particles of the same charge repel each other is of relevance here. This leads to a uniform packing density of the particles on the building platform surface and prevents the formation of conglomerates on the surface. Unevenly charged particles attract each other, however, are separated in the electric field, so that in the end the particles in the field are kept at a distance to each other and there are no imperfections in the layer due to unevenly charged particles.

From the above explanations it becomes clear that the properties of the electrostatically applied powder layer and the necessary field strength for the coating depend on the conductivity of the powder. If the conductivity of the powder is high, then a charge compensation between neighbouring particles can occur more quickly. As soon as both particles have the same charge, however, they repel each other, which leads to a more uniform layer application.

As is shown by the above explanations, a layer can be applied onto the building platform or the surface of a previously solidified layer (in the following generally an 'application surface' is mentioned) merely by providing the necessary electric field. In the process the layer application is controlled via the field strength that is generated between the electrodes and the duration of time, during which the electric field is applied. Here, the necessary field strength need not be adjusted via the applied voltage alone. It is also possible to adjust the field strength via the distance between the powder container and the building platform. This can be effected by means of the lifting device 36. The powder container can then be moved by moving it in the space and/or rotating it around a (for example vertical) axis that is lying outside of the powder container.

As the electric field can also cause a compaction of the powder in the powder reservoir, which is undesired, there is provided a shaking mechanism or a vibration mechanism 43 at the powder container 35, by which such a compaction can be successfully opposed. For instance, the powder container can be elastically suspended with a motor being attached to the bottom side of the powder container, wherein the motor has an eccentric weight at the axis of rotation. However, alternatively also a shaking movement of the mounting of the powder container can be effected. Furthermore, various shaking devices or vibrators, ultra-sound vibrators or stirring devices may be used. Due to the shaking movement and due to the effect of the electric field an equilibrium between adhering powder and powder that has been repelled again is reached between the electrodes (building platform/powder container), which is shown in the figures by a cloud.

After the application of the layer the electric field is switched off and a selective solidification is carried out by means of electromagnetic radiation. Here it need not necessarily be laser light, but also heat radiation or particle radiation are conceivable. Alternatively also an adhesive may be selectively sprayed on. FIG. 4 shows the device according to the first embodiment in a state in which an applied powder layer is being solidified. Here, as an example, a laser beam source 39 is shown, which directs a beam that has been deflected by a deflection device 38 through a beam entrance window 40 onto the powder layer on the building platform 31. For this the powder container is moved away from the building platform 31 by means of the drive 37 and the irradiation device (38, 39) is moved under the building platform 31. Of course it is also possible that the irradiation device is stationary and only the powder container is moved. During the exposure the high voltage is switched off. However, it is also conceivable to keep the voltage being applied, because the necessary field strength for a powder application is not attained due to the large distance between the powder container 35 and the building platform 31.

Second Embodiment

Figure 5:
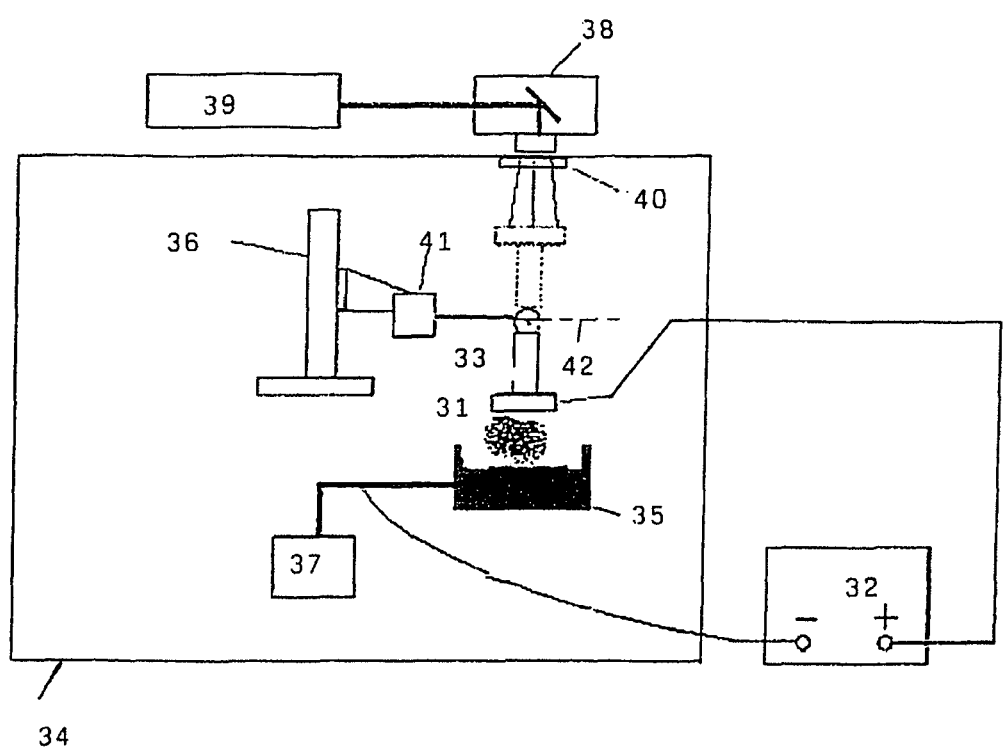
FIG. 5 shows a second embodiment of the invention.

In order to prevent the powder particles from coming off the building platform 1, which is facing downward according to embodiment 1, in the course of time, it is advantageous to have the building platform 1 facing downwards only during the powder application. According to a second embodiment, which is shown in FIG. 5, the building platform 31 therefore is no longer rigidly connected to the lifting device 36, but can be rotated around a horizontal axis 42 by means of a rotating device 41. Thereby it is possible to turn the building platform up via a rotation around the axis of rotation 42 after the completion of the application procedure, so that the applied layer faces the beam entrance window. Here, the building platform 31 is spatially separated from the mounting at the lifting device 36 by means of an insulator 33, which at the same time electrically decouples the building platform from the lifting device. With regard to the illustration of FIG. 5 it has to be noted that the building platform 31 cannot be in the upper exposure position and the lower powder application position at the same time. Therefore, the building platform is shown with a dashed line in the exposure position in order to make clear that both positions of the building platform are occupied at different times.

The exposure need not necessarily be effected in the upper position in FIG. 5. The exposure device might as well be located laterally to the axis of rotation 42, so that between the powder application position and the exposure position there is merely a rotation by an angle of 90°. Very generally it is possible to choose an arbitrary angle differing from 180°.

Incidentally, for the second embodiment the same possibilities of variations are possible that were described with respect to the first embodiment.

Third Embodiment

Figure 6:
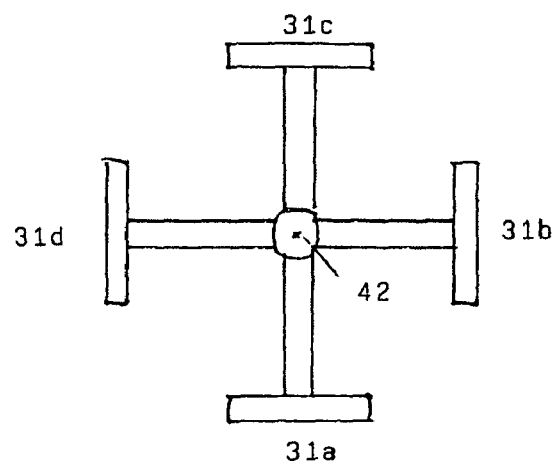
FIG. 6 shows a third embodiment of the invention.

FIG. 6 shows a view of a device according to a third embodiment of the invention as seen from a position on the axis of rotation 42.

Building platforms 31a, 31b, 31c, 31d that are arranged around the axis of rotation 42 having an angle of 90° to one another can be seen. Except this plurality of building platforms together with their respective mountings the device according to the third embodiment is identical to the one of the second embodiment.

According to the third embodiment it is for example possible that during the powder application onto the building platform 31a simultaneously the powder layer that has been previously applied onto the building platform 31c is exposed from above. This leads to a reduction of the building time. Though in FIG. 6 four building platforms are shown as an example, it is as well possible to use a different number of building platforms, in particular two building platforms opposite to one another. Moreover, in the third embodiment the exposure need not always be effected on the building platform that is facing upwards (building platform 31c in FIG. 6), but might as well be effected at the building platform facing to the left or to the right (building platforms 31d and 31b, respectively). In addition it is also as well possible to provide a plurality of solidification devices.

Fourth Embodiment

Figure 7:
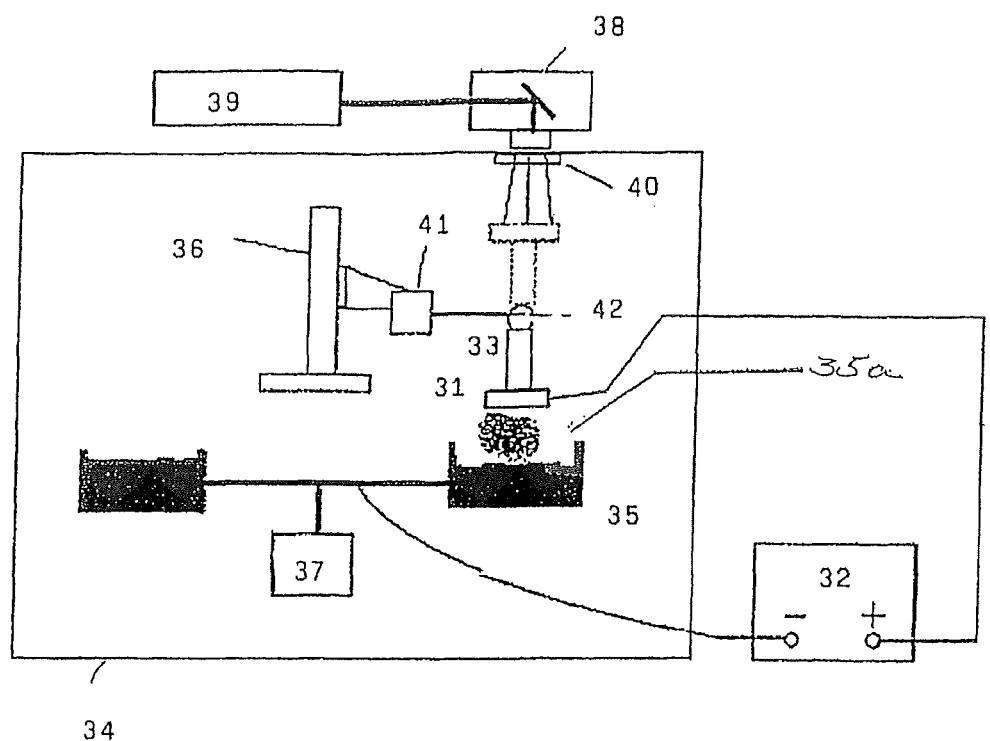
FIG. 7 shows several powder reservoirs according to a fourth embodiment of the invention.

FIG. 7 shows a device according to a fourth embodiment of the invention.

Compared to the devices of the previous embodiments there are several powder containers 35 (in FIG. 7 as an example two) present in the fourth embodiment. As the individual powder containers may contain different materials, it is thus possible to successively apply layers of different powder materials. For instance, at first a powder layer can be applied by the right container in FIG. 7 and can be sintered. In the next layer application procedure the container shown in FIG. 7 at the left can then be moved under the building platform 31, which is facing downwards. Of course an arbitrary succession of material layers is possible. Furthermore, it would also be possible to generate on one building platform different bodies from different materials. Finally, it is even possible to introduce into the part besides structure gradients also three-dimensional material gradients in a horizontal and a vertical building direction. There is as well the possibility to mix powder from several different containers during the application of one powder layer by moving plural powder containers under the building platform 21 for an application of the mentioned one layer.

In each of embodiments 1 to 3 it is possible to provide several powder containers.

Further Modifications

In all above described embodiments also the following modifications are possible:

The velocity of a powder particle that hits the building platform when a high voltage is applied depends on the field strength and thus on the acceleration voltage. In order to achieve a particularly good adhesion of the powder particles it is furthermore possible to use a high voltage in the form of a pulsed direct voltage that causes an intermittent movement of the powder particles towards the building platform 21, whereby a "knocking in" is implemented.

Furthermore, it is possible to prevent a compaction of the powder in the powder container by a stirring of the powder in the powder container by means of a stirring device instead of shaking and vibrating, respectively, the powder container.

In all embodiments and modification alternatives it is furthermore possible to provide in the building container 34a gas inlet, through which an inert gas can be introduced in order to avoid an oxidation of the powder particles during the building process.

In particular functional surfaces, meaning portions and cut-outs, respectively, of larger surfaces, which potentially are subjected to a higher wear, for example because they serve as guideway, may be selectively made more wear-resistant by the method according to the invention. Here, by the electrostatic powder application at least one layer of a ceramics material or of another material can be applied in order to finish the surfaces of such guidance faces and thereby specifically make them more wear-resistant.

Though in all figures the powder container 35 is completely open to the building platform 31, in all embodiments the powder container 35 can be designed such that it is a metallic conducting swap cartridge that is inserted into a vibrator insert of the vibration mechanism 43. The cartridges are provided with an opening mechanism that is designed such that the cartridge in each case is opened before the powder application and is closed after the extraction of the powder. Here, it is not absolutely necessary to remove the complete cover of the cartridge for opening the cartridge. Rather, it is also possible that only an opening 35a in the cover facing the building platform is uncovered during the application of powder.

It is a particular advantage of the invention that no part destruction may occur by fragments between a doctor edge and the part. Any mechanical interaction with a powder application device is missing.

Furthermore, from the method according to the invention and the device according to the invention the advantage arises that no powder bed must be kept ready in order to manufacture the parts. Rather, only such an amount of powder is needed that occupies the actual volume of the part. From this a potential for saving material, in particular when using cost-intensive precious metals, results. Due to gravity only a thin powder layer may form on the building platform, which powder layer overlays the surface with a uniform thickness of powder. After the solidification process surplus unsintered material due to the gravitational force falls back into the powder container when powder is applied again (before the application of the high voltage).

Furthermore, during the electrostatic layer application a selection based on the grain size of the powder starting material occurs, because lighter powder particles are more likely lifted from the powder container. Thereby extremely thin, and at the same time dense, powder layers on the building platform 21 are possible and the applied layer is very uniform.

Furthermore, structures and bodies may be integrated in existing bodies, which would be impossible in doctor-based sintering machines. For an electrostatic application the application of powder may also take place in recesses, whereby powder may be applied later in existing geometric bodies such as in cavities and then solidified. Thereby, a mixed construction of semi-finished products in connection with sinter walls for building up complex bodies is possible. For instance, gears having a wear-resistant geared ring can be produced with a high precision in a cost-effective way. Another application is the insertion of precise walls or geometries in conventionally manufactured packages or similar.

Finally, as there is no time-consuming spreading process with a doctor-blade, by the electrostatic powder application a reduction of the building time results.

The invention claimed is:

1. A method for a layer-wise manufacturing of a three-dimensional object having by repeating the steps:
    applying a powder layer of a building material in powder form onto an application surface of a building platform or a previously solidified layer and
    selectively solidifying said building material of said powder layer in order to form a cross-section of said object, wherein said building material is solidified at a plurality of positions in said powder layer that correspond to said cross-section of said object,
    wherein said building material is applied by generating an electric field between a powder container and said building platform, said powder container having an opening and containing said building material in powder form,
    wherein said building material is applied by positioning said building platform and said powder container such that said building platform faces said opening of said powder container, and
    wherein said building material is applied by transferring said building material by said electric field against the gravitational force through said opening of said powder container onto said application surface.

2. The method according to claim 1, further comprising subjecting the powder container to a vibration or a shaking process or keeping the powder in the powder container in motion during the layer application by means of a stirring device.

3. The method according to claim 1, further comprising adjusting the electric field by varying the distance between the powder container and the building platform.

4. The method according to claim 1, in which the solidification is effected by the action of electromagnetic radiation on the powder.

5. The method according to claim 1, further comprising generating the object in a recess of the application surface or in a cavity of another object.

6. The method according to claim 1, further comprising using a metal powder, precious metal powder, ceramics powder, oxide powder or plastic powder as building material.

7. The method according to claim 1, further comprising using different powders from several different powder containers that differ in material and/or a median grain size for the layer application.

8. The method according to claim 7, further comprising using several different powder containers for the application of one layer.

* * * * *